(12) United States Patent
Shi et al.

(10) Patent No.: US 10,708,490 B2
(45) Date of Patent: Jul. 7, 2020

(54) APPARATUS AND METHOD FOR CONTROLLING VIDEO CALL, AND VIDEO CALLING SYSTEM

(71) Applicant: BOE TECHNOLOGY GROUP CO., LTD., Beijing (CN)

(72) Inventors: Bingchuan Shi, Beijing (CN); Baoyin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/409,743

(22) Filed: May 10, 2019

(65) Prior Publication Data

US 2020/0106954 A1   Apr. 2, 2020

(30) Foreign Application Priority Data

Sep. 29, 2018   (CN) .......................... 2018 1 1152329

(51) Int. Cl.
*H04N 5/232* (2006.01)
*G06T 7/70* (2017.01)
*H04N 7/14* (2006.01)

(52) U.S. Cl.
CPC .......... *H04N 5/23219* (2013.01); *G06T 7/70* (2017.01); *H04N 7/142* (2013.01); *H04N 7/147* (2013.01);
(Continued)

(58) Field of Classification Search
CPC combination set(s) only.
See application file for complete search history.

(56) References Cited

U.S. PATENT DOCUMENTS 10,321,123 B2    6/2019  Sommerlade et al.
2009/0278913 A1* 11/2009  Rosenfeld .............. H04N 7/144
                                                     348/14.16
(Continued)

FOREIGN PATENT DOCUMENTS

CN    103458219 A    12/2013
CN    105898136 A     8/2016
(Continued)

OTHER PUBLICATIONS

First Chinese Office Action dated Mar. 16, 2020, received for corresponding Chinese Application No. 20181152329.4, 26 pages.

*Primary Examiner* — Phung-Hoang J Nguyen
(74) *Attorney, Agent, or Firm* — Kinney & Lange, P.A.

(57) ABSTRACT

An apparatus and method for controlling a video call, and a video calling system are disclosed. The apparatus for controlling a video call includes: a transceiver configured to receive, in a display time period, video information of a remote party and transmit video information of a local party; a processor communicatively connected to the transceiver; and a memory having stored thereon instructions which, when executed by the processor, cause the processor to: control, at least in a collection time period, the video collector to collect the video information of the local party, and control, in the collection time period, the video collector to be aligned with a face of the local party; and control, in the collection time period, the display apparatus to be in a non-display state, and control, in the display time period, the display apparatus to display a video of the remote party according to the video information of the remote party. The video calling system includes the apparatus for controlling a video call described above.

18 Claims, 5 Drawing Sheets

(52) U.S. Cl.
CPC .............. *G06T 2207/10016* (2013.01); *G06T 2207/30201* (2013.01)

(56) References Cited

U.S. PATENT DOCUMENTS

| | | | |
|---|---|---|---|
| 2012/0257004 A1* | 10/2012 | Smith | H04N 7/144 348/14.16 |
| 2016/0050391 A1 | 2/2016 | Schultz et al. | |
| 2016/0142676 A1* | 5/2016 | Berini | H04N 7/142 348/14.08 |
| 2020/0021794 A1 | 1/2020 | Sommerlade et al. | |

FOREIGN PATENT DOCUMENTS

| | | |
|---|---|---|
| CN | 106921818 A | 7/2017 |
| CN | 108463787 A | 8/2018 |

\* cited by examiner

APPARATUS AND METHOD FOR CONTROLLING VIDEO CALL, AND VIDEO CALLING SYSTEM

CROSS-REFERENCE TO RELATED APPLICATION(S)

This application claims priority to the Chinese Patent Application No. CN201811152329.4, filed on Sep. 29, 2018, entitled "APPARATUS AND METHOD FOR CONTROLLING VIDEO CALL, AND VIDEO CALLING SYSTEM," which is incorporated herein by reference in its entirety.

TECHNICAL FIELD

The present disclosure relates to the field of video calling technology, and more particularly, to an apparatus and method for controlling a video call, and a video calling system.

BACKGROUND

Video calling is a communication method based on Internet technology, which may be used to transmit user voice and images by using communication devices.

Currently, communication devices used for video calling are generally mobile phones, tablet computers etc. A camera required for video calling is disposed at an edge of a communication device to prevent the camera from blocking a picture displayed by the communication device. Although this does not affect picture transmission, during a video call, eyes of a user generally directly face a display screen of the communication device, which may cause a distorted expression exhibited on a facial picture collected by the camera and cause a remote user participating in the video call to not be able to accurately determine meanings of the facial expression of the local party, thereby affecting the user experience during the video call.

SUMMARY

The present disclosure provides an apparatus for controlling a video call, comprising: a transceiver configured to receive, in a display time period, video information of a remote party and transmit video information of a local party; a processor communicatively connected to the transceiver; and a memory having stored thereon instructions which, when executed by the processor, cause the processor to: control, at least in a collection time period, a video collector to collect the video information of the local party, and control, in the collection time period, the video collector to be aligned with the face of the local party; and control, in the collection time period, a display apparatus to be in a non-display state, and control, in the display time period, the display apparatus to display a video of the remote party according to the video information of the remote party.

The present disclosure further provides a video calling system, comprising: a display panel, a video collector, and the apparatus for controlling a video call described above, wherein the video collector and the display panel are communicatively connected to the apparatus for controlling a video call.

The present disclosure further provides a method for controlling a video call comprising a plurality of call periods, each of the call periods comprises a display time period and a collection time period, the method comprising, in each of the call periods, receiving video information of a remote party;
controlling, in a display time period, the display apparatus to display a video of the remote party according to the video information of the remote party;
controlling, in a collection time period, the display apparatus to be in a non-display state, controlling, at least in the collection time period, the video collector to collect video information of a local party, and controlling, in the collection time period, the video collector to be aligned with a face of the local party; and
transmitting the video information of the local party.

The present disclosure further provides a non-transitory computer storage medium having stored thereon computer instructions which, when executed by a processor, cause the processor to perform the method described above.

The present disclosure further provides a terminal for controlling a video call, comprising a processor, a memory, a transceiver, and a bus, wherein the processor, the memory and the transceiver communicate with each other through the bus.

BRIEF DESCRIPTION OF THE DRAWINGS

The accompanying drawings described herein are intended to provide a further understanding of the present disclosure, and constitute a part of the present disclosure. Illustrative embodiments of the present disclosure and description thereof are used to explain the present disclosure, and are not intended to improperly limit the present disclose. In the accompanying drawing.

DETAILED DESCRIPTION

The technical solutions in the embodiments of the present disclosure will be clearly and completely described below with reference to the accompanying drawings in the embodiments of the present disclosure. It is obvious that the embodiments described are only a part of the embodiments of the present disclosure, instead of all the embodiments. All other embodiments obtained by those of ordinary skill in the art based on the embodiments of the present disclosure without any creative work fall within the protection scope of the present disclosure.

Related video calling apparatuses may be mobile phones, tablet computers, desktop computers, etc., and each generally comprise a sound collection unit, a camera unit, a display unit, a speaker unit, and an information transceiving unit. During a video call, a camera unit included in a video calling apparatus of a local party collects image information of the local party, a sound collection unit included in the video calling apparatus of the local party collects audio information of the local party, and an information transceiving unit included in the video calling apparatus of the local party may transmit the image information of the local party and the audio information of the local party to a video calling apparatus of a remote party. At the same time, the information transceiving unit included in the video calling apparatus of the local party receives image information of the remote party and audio information of the remote party, a display unit included in the video calling apparatus of the local party displays the image information of the remote party, and a speaker unit included in the video calling apparatus of the local party plays the audio information of the remote party, thereby implementing the video call. Currently, the camera unit is generally disposed in a frame portion of the display unit to prevent the camera unit from obstructing a local user to view the image information of the remote party displayed by the display unit. However, this may also cause a distorted expression exhibited on a facial picture of the local user which is collected by the video calling apparatus of the local party, which may cause the remote user not be able to accurately determine meanings of the facial expression of the local party, thereby affecting the user experience during the video call. For example, a camera of a mobile phone is located on a frame of the mobile phone, and eyes of a local user are directly facing a screen of the mobile phone during a video call, which makes the camera of the mobile phone only collect an eye picture of the local party obliquely during the video call. Thereby, this results in that the eye picture collected by the camera cannot accurately exhibit an eye expression of the local user, which makes the remote user cannot accurately understand meanings conveyed by the local user.

Figure 1:
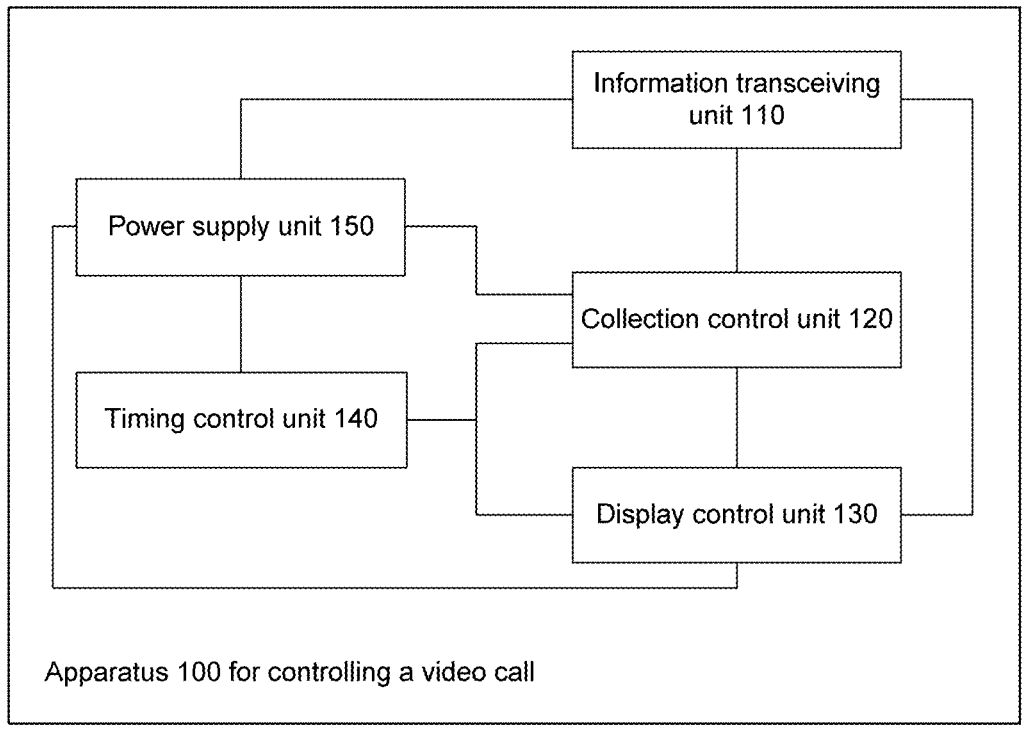
FIG. 1 is a structural block diagram of an apparatus for controlling a video call according to an embodiment of the present disclosure.
Figure 5:
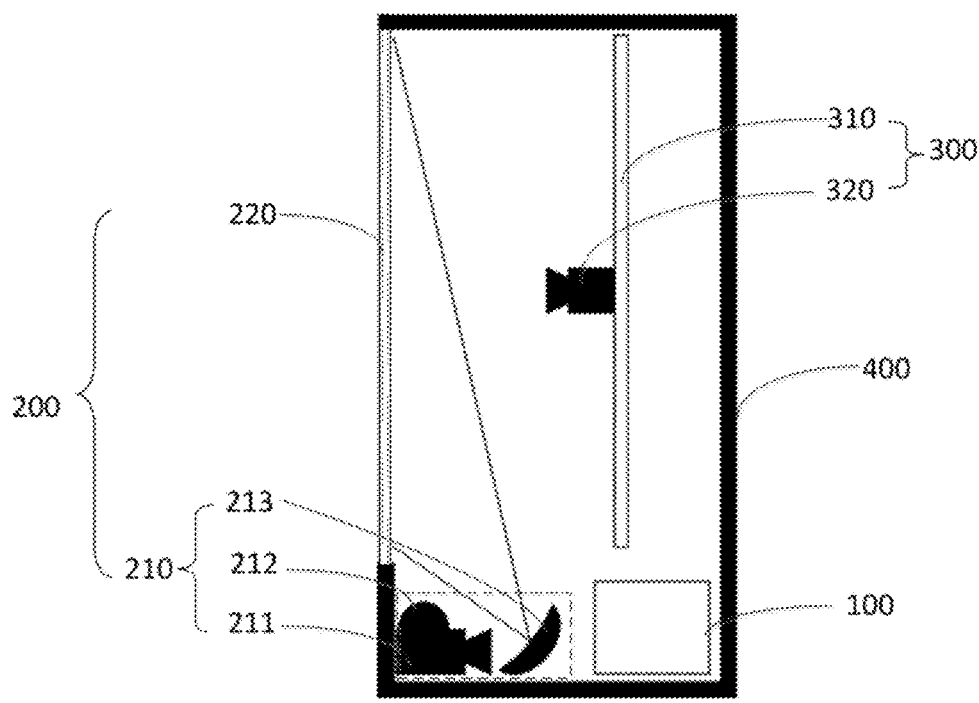
FIG. 5 is a schematic structural diagram of a video calling system according to an embodiment of the present disclosure.

In view of the above problems, as shown in FIGS. 1 and 5, the embodiments of the present disclosure provide an apparatus 100 for controlling a video call, which comprises an information transceiving unit 110, a collection control unit 120, and a display control unit 130.

The information transceiving unit 110 is configured to receive video information of a remote party and/or transmit video information of a local party.

The collection control unit 120 is connected to the information transceiving unit 110, and is configured to control, at least in a collection time period, a video collector 300 (for example, as shown in FIG. 5) to collect the video information of the local party, and control the video collector 300 to be aligned with a face of the local party. Here, controlling the video collector 300 to be aligned with the face of the local party refers to controlling the video collector 300 to be aligned with a geometrical center of the face of the local party.

The display control unit 130 is connected to the information transceiving unit 110, and is configured to control, in the collection time period, a display apparatus 200 (for example, as shown in FIG. 5) to be in a non-display state, and control, in a display time period, the display apparatus 200 to display a video of the remote party according to the video information of the remote party.

Here, a function of the information transceiving unit 110 may be implemented by hardware such as a signal transceiver etc., and functions of the collection control unit 120 and the display control unit 130 may be implemented by hardware such as a processor etc. The processor may be a Central Processing Unit (CPU for short), or an Application Specific Integrated Circuit (ASIC for short), or one or more integrated circuits configured to implement the embodiments of the present disclosure, for example, one or more Digital Signal Processors (DSPs for short), or one or more Field Programmable Gate Arrays (FPGAs). At the same time, the hardware structures which realize the functions of the information transceiving unit 110, the collection control unit 120, and the display control unit 130 may be integrated on a chip.

It may be known based on the structure of the apparatus 100 for controlling a video call according to the embodiment of the present disclosure that, the display control unit 130 may control, in the display time period, the display apparatus 200 to display the video of the remote party according to the video information of the remote party, and control, in the collection time period, the display apparatus 200 to be in the non-display state, and the collection control unit 120 may control, at least in the collection time period, the video collector 300 to collect the video information of the local party, and control, in the collection time period, the video collector 300 to be aligned with the face of the local party, which enables the video collector 300 to directly face the local user when the user makes a video call using the apparatus 100 for controlling a video call. Thereby, a relatively real facial expression is conveyed by the video information of the local party, which ensures that the remote user may accurately understand meanings expressed by the face of the local user by using the video information of the local party, thereby improving the user experience during the video call.

It may be understood that, as shown in FIG. 1, the apparatus 100 for controlling a video call further comprises: a timing control unit 140 connected to the collection control unit 120 and the display control unit 130 and configured to control a video call timing, so that the video call is switched between the display time period and the collection time period alternatively. That is, the timing control unit 140 may control a timing of the video call, so that one video call period comprises a display time period and a collection time period.

Duration of each video call period may be set according to practical conditions, and a time required for the display time period may be the same as or different from a time required for the collection time period, but for convenience of control, the time required for the display time period may be set to be equal to the time required for the collection time period. In order to ensure that the video information of the local party is collected consecutively and the video of the remote party is displayed consecutively during the video call, the time of each display time period and the time of each collection time period should not be too long, and are generally in units of milliseconds.

It should be illustrated that, as shown in FIG. 1, the apparatus 100 for controlling a video call further comprises a power supply unit 150. The power supply unit 150 is connected to the information transceiving unit 110, the display control unit 130, and the collection control unit 120 respectively, to provide power to the information transceiving unit 110, the display control unit 130 and the collection control unit 120.

Figure 2:
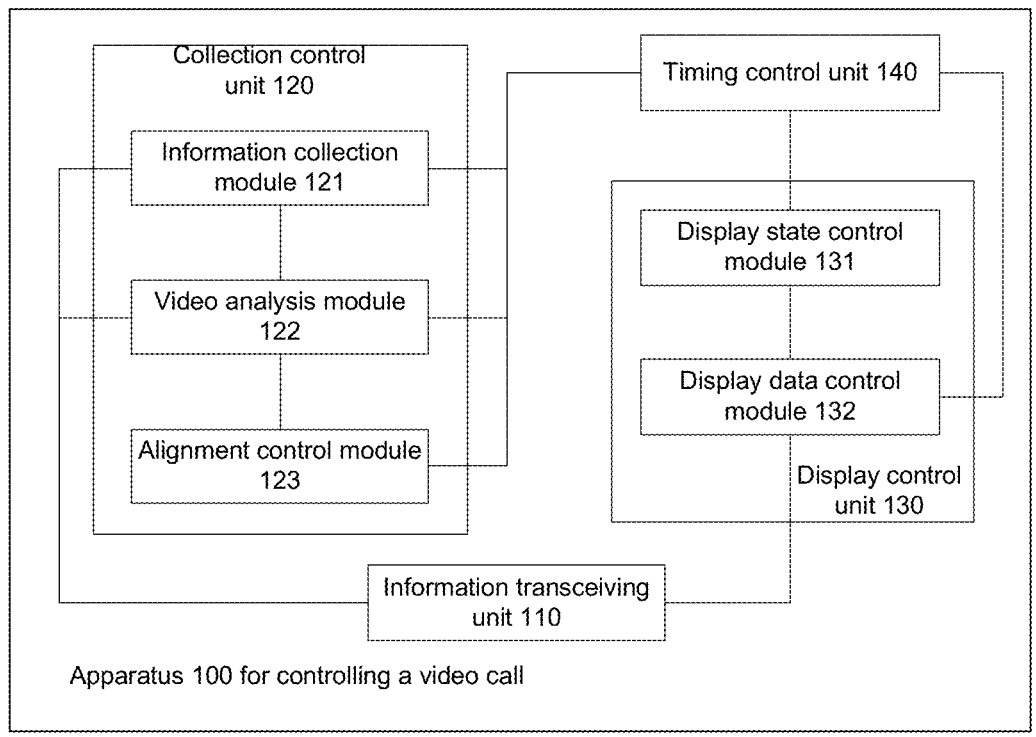
FIG. 2 is a structural block diagram of an apparatus for controlling a video call according to another embodiment of the present disclosure.
Figure 3:
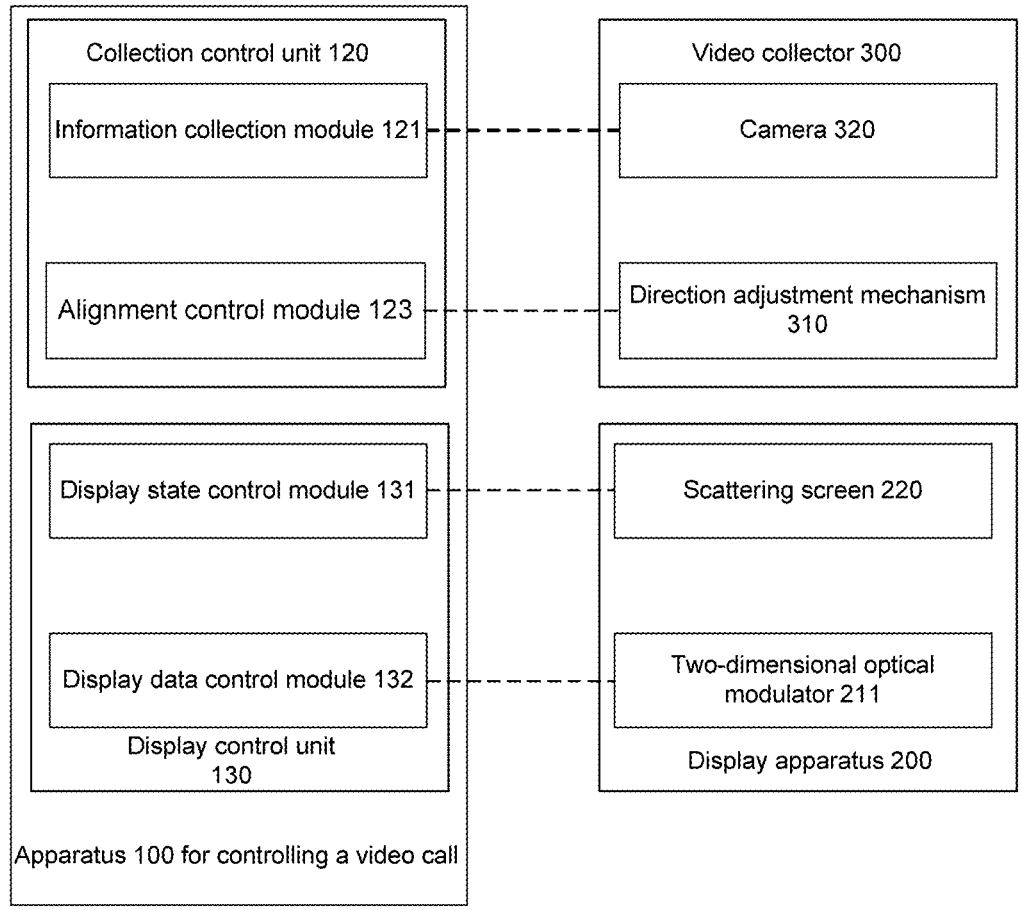
FIG. 3 is a schematic diagram of controlling a video calling system according to an embodiment of the present disclosure.

In some embodiments, as shown in FIGS. 2, 3 and 5, the above display control unit 130 comprises a display state control module 131 and a display data control module 132.

The display state control module 131 is connected to the timing control unit 140 described above, and is configured to control, in the display time period, the display apparatus 200 to be in a display state, and control, in the collection time period, the display apparatus 200 to be in a transparent state, i.e., the non-display state. Here, the display apparatus 200 is a display apparatus 200 which may be switched between the transparent state and a non-transparent state.

The display data control module 132 is connected to the timing control unit 140 and the information transceiving unit 110, and is configured to control a display time, so that a time interval between two adjacent video display processes of the display apparatus 200 is equal to a time taken for one collection time period, and control the display apparatus 200 to display the video of the remote party according to the video display time of the display apparatus 200, wherein each video display time of the display apparatus 200 should satisfy the requirements for displaying at least one frame of image.

It may be seen from the specific structure of the display control unit 130 that the display state control module 131 is connected to the timing control unit 140, so that, according to the video call timing controlled by the timing control unit 140, the display state control module 131 controls, in the display time period, the display apparatus 200 to be in the display state, and controls, in the collection time period, the display apparatus 200 to be in the transparent state. When the display apparatus 200 is controlled in the collection time period to be in the transparent state, if the local user is located on a display side of the display apparatus 200, and the video collector 300 is located on one side of the display apparatus 200 away from the display side, the video collector 300 may collect, in the collection time period, the facial picture of the local user using the display apparatus 200 which is in the transparent state. Further, the display data control module 132 is connected to the timing control unit 140 and the information transceiving unit 110 respectively, so that it is ensured that, when the display data control module 132 controls the image collection time of the display apparatus 200, the time interval between two adjacent video display processes of the display apparatus 200 is equal to a time taken for one collection time period under control of the timing control unit 140. In this way, the display apparatus 200 stops display of the video of the remote party in the collection time period, thereby ensuring that the video collector 300 collects the image of the local user in the collection time period without any interference from the remote party.

In some embodiments, as shown in FIGS. 2, 3 and 5, the collection control unit 120 described above comprises an information collection module 121, a video analysis module 122 and an alignment control module 123.

The video analysis module 122 is connected to the information transceiving unit 110 and the timing control unit 140, and is configured to analyze the video information of the remote party in the display time period to obtain position information of a midpoint of eyes of the remote party, and analyze the image information of the local party in the collection time period to obtain position information of the face of the local party. The position information of the midpoint of the eyes of the remote party refers to coordinate information of the midpoint of the eyes of the remote party, and the position information of the face of the local party refers to coordinate information of a geometric center of the face of the local party.

The alignment control module 123 is connected to the video analysis module 122 and the timing control unit 140, and is configured to control a position of the video collector 300 relative to the display apparatus 200 according to the position information of the midpoint of the eyes of the remote party, so that the video collector 300 is aligned with a position of the midpoint of the eyes of the remote party displayed by the display apparatus 200, and control a collection angle of the video collector 300 according to the position information of the face of the local party, so that a lens of the video collector 300 is aligned with the face of the local party.

If a time taken for a display time period and a time taken for a collection time period in a video call period are only at a millisecond level, it is difficult for naked eyes to distinguish the existence of the collection time period. In this case, during the video call, although the collection time period and the display time period are two time periods independent of each other, a continuous video of the remote party is viewed by the local user. Further, the time taken for a display time period and the time taken for a collection time period in the video call period are only at a millisecond level, a position of a face of the remote party displayed by the display apparatus 200 may not change too much in a very short time, and a position of the face of the local user relative to the display apparatus 200 may not change too much either. Therefore, in a video call period, when it needs to align the video collector 300 with the midpoint of the eyes of the remote party displayed by the display apparatus 200, it only needs to move the video collector 300 to the position of the midpoint of the eyes of the remote party displayed by the display apparatus 200, and when it needs to control a collection angle of the video collector 300 according to the position information of the face of the local party, it only needs to rotate the lens of the video collector 300, so that the lens of the video collector 300 is aligned with the face of the local party. At this time, when the video information of the local party collected by the video collector 300 is transmitted to a video calling apparatus held by the remote user, the face of the remote party is directly facing the face of the local user displayed by the video calling apparatus held by the remote user. Therefore, the apparatus 100 for controlling a video call according to the embodiment of the present disclosure may enable the local user and the remote user to accurately determine a facial expression of each other, which achieves the effects of remote face-to-face communication, thereby further improving the user experience.

The information collection module 121 is connected to the timing control unit 140, the information transceiving unit 110, and the video analysis module 122, and is configured to control an image collection time of the video collector 300, so that a time interval between two adjacent collection processes of the video collector 300 is less than or equal to a time taken for one display time period, and control, in the collection time period, the video collector 300 to collect the image information of the local party according to the image collection time of the video collector 300.

When the time interval between the two adjacent collection processes of the video collector 300 is equal to the time taken for one display time period, the video collector 300 is in a turn-off state in the display time period, and all or a part of the image information of the local party collected by the video collector 300 in one video call period may be converted into the video information of the local party.

When the time interval between the two adjacent collection processes of the video collector 300 is less than the time taken for one display time period, the video collector 300 is in a turn-on state in a part or all of the display time period. At this time, the image information of the local party collected in the display time period needs to be firstly removed from the image information of the local party collected by the video collector 300 in one video call period, and then all or a part of the image information of the local party collected in the collection time period is converted into the video information of the local party, thereby avoiding the interference of the image information of the local party collected in the display time period on the video information of the local party. Although the video information of the local party generated by processing the image information of the local party in this way may not be interfered by the image information of the local party collected in the display time period, the complexity of information processing is increased.

Considering that each video call period comprises not only a display time period but also a collection time period, although it is difficult for naked eyes to distinguish the existence of the collection time period in a case where the display time period and the collection time period are relatively short, if a time interval between display processes of the video of the remote party in two adjacent display time periods is inconsistent with a time interval between two adjacent video frames of the video of the remote party, it may result in slightly poor consistency of the video of the local party which is displayed using the video information of the local party collected by the video collector 300. Based thereon, the information collection module 121 is further configured to obtain image frame information collected in at least one collection time period from the image information of the local party, and convert the image frame information collected in the at least one collection time period into the video information of the local party, so that a frame rate of the video of the local party is kept constant during the video call.

As shown in FIGS. 3 and 5, the embodiments of the present disclosure further provide a video calling system, comprising the display apparatus 200, the video collector 300, and the apparatus 100 for controlling a video call according to the above technical solution. The video collector 300 is connected to the collection control unit 120, and the display apparatus 200 is connected to the display control unit 130.

Compared with the related art, the beneficial effects of the video calling system according to the embodiment of the present disclosure are the same as those of the apparatus 100 for controlling a video call according to the above embodiment, and will not be described in detail herein.

It may be understood that the power supply unit 150 included in the apparatus 100 for controlling a video call described above may also provide power to the display apparatus 200 and/or the video collector 300. Of course, it is also possible to configure respective power supply apparatuses for the display apparatus 200 and the video collector 300 separately.

In some embodiments, as shown in FIG. 5, the above display apparatus 200 comprises a scattering screen 220 and a projection unit 210.

The scattering screen 220 is in a scattering state in the display time period and is in a transparent state in the collection time period. A display surface of the scattering screen 220 faces away from a projection surface of the scattering screen 220, and the video collector 300 is located on one side of the scattering screen 220 where the projection surface is located.

The projection unit 210 is configured to convert the video information of the remote party into the video of the remote party in the display time period, and project a displayed picture onto the projection surface of the scattering screen 220.

As shown in FIGS. 2 and 3, when the display control unit 130 comprises the display state control module 131 and the display data control module 132, the display state control module 131 is connected to the scattering screen 220 to control the scattering screen 220 to be in the scattering state or the transparent state. When the scattering screen 220 is in the scattering state, the projection unit 210 may project the video of the local party onto the projection surface of the scattering screen 220 at this time. Since the display surface of the scattering screen 220 faces away from the projection surface of the scattering screen 220, the video collector 300 is located on the side of the scattering screen 220 where the projection surface is located, which allows the local user to be located on one side of the scattering screen 220 where the display surface is located while the local user views a picture displayed by the display apparatus 200. When the scattering screen 220 is in the transparent state in the collection time period, the video collector 300 may collect the user located on the side of the scattering screen 220 where the display surface is located through the transparent scattering screen 220.

If the projection unit 210 still projects the video of the remote party onto the projection surface of the scattering screen 220, it may have a certain influence on the collection of the image of the local party. For this reason, it needs to define a projection time of the projection unit 210. For example, a time interval between two adjacent projection processes of the projection unit 210 is defined to be equal to the time taken for one collection time period to ensure that the projection unit 210 performs projection only in the display time period. As for the time interval between the two adjacent image collection processes of the video collector 300, reference may be made to the above description, that is, the time interval between the two adjacent image collection processes of the video collector 300 is less than or equal to the time taken for one display time period. When the time interval between the two adjacent image collection processes of the video collector 300 is less than the time taken for one display time period, it may increase the difficulty in processing the image information of the local party. When the time interval between the two adjacent image collection processes of the video collector 300 is equal to the time taken for one display time period, it may result in reduced difficulty in processing the image information of the local party collected by the video collector 300.

It should be illustrated that a time of one projection process of the projection unit 210 should satisfy a time taken for display of at least one frame of video of the remote party, and a time of one image collection process of the video collector 300 should satisfy a time taken for collection of at least one frame of image of the local party. A time during which the scattering screen 220 is maintained in the scattering state should satisfy the time taken for the projection unit 210 to project at least one frame of video of the remote party. A time during which the scattering screen 220 is maintained in the transparent state should satisfy the time taken for the video collector 300 to collect at least one frame of image of the local party.

As shown in FIGS. 2 and 3, when the display state control module 131 is connected to the scattering screen 220 and the display state control module 131 is connected to the timing control unit 140, a state of the scattering screen 220 is switched between the scattering state and the transparent state alternatively.

Figure 6:
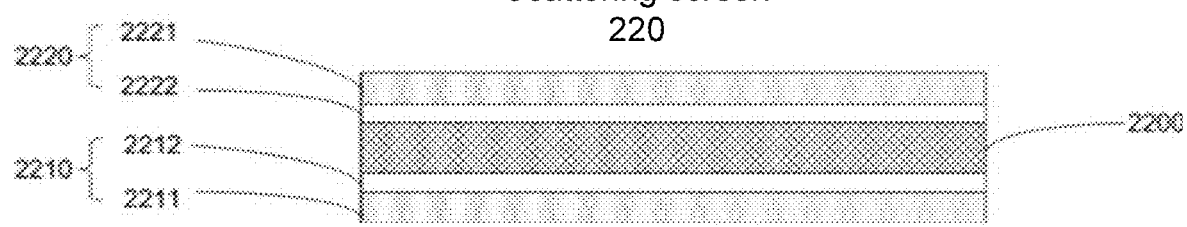
FIG. 6 is a schematic structural diagram of a scattering screen according to an embodiment of the present disclosure.
Figure 7:
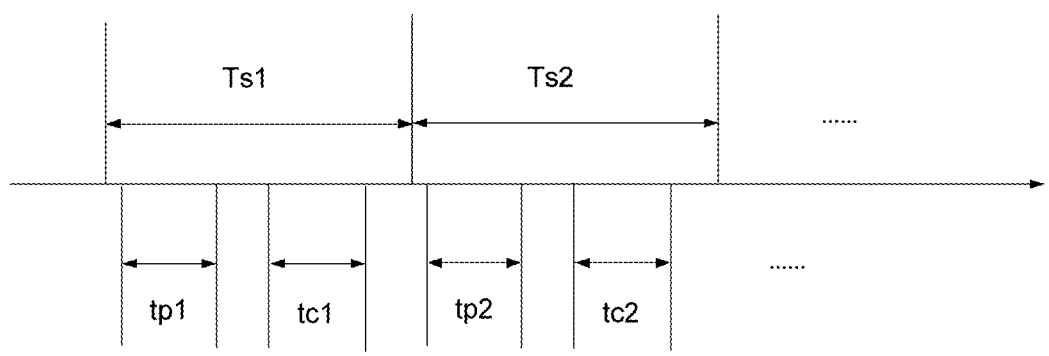
FIG. 7 is a timing distribution diagram of a video call period according to an embodiment of the present disclosure.

In some embodiments, as shown in FIGS. 3 and 6, the scattering screen 220 described above comprises a first electrode plate 2210, a second electrode plate 2220, and a polymer dispersed liquid crystal layer 2200 between the first electrode plate 2210 and the second electrode plate 2220. The display state control module 131 is connected to the first electrode plate 2210 and the second electrode plate 2220 respectively. When the display state control module 131 does not provide voltages to the first electrode plate 2210 and the second electrode plate 2220, the polymer dispersed liquid crystal layer 2200 is in a chaotic state, and may scatter light of the video of the remote party projected onto the projection surface of the scattering screen 220. At this time, the local user may clearly view the video of the remote party on the side of the scattering screen 220 where the display surface is located. That is, the polymer dispersed liquid crystal layer 2200 is in the chaotic state, so that the formed scattering screen 220 may have a function of projection screen. When the display state control module 131 provides voltages to the first electrode plate 2210 and the second electrode plate 2220, the polymer dispersed liquid crystal layer 2200 is in an electric field formed by the first electrode plate 2210 and the second electrode plate 2220, so that the polymer dispersed liquid crystal layer 2200 is in a clear state, and the scattering screen 220 is in a transparent state. The scattering screen 220 may make a response at a millisecond level, which is advantageous in ensuring that a time taken for a display time period of each video call period is in units of a time taken for a frame of video.

In some embodiments, as shown in FIG. 6, the first electrode plate 2210 comprises a first base substrate 2211 and a first surface electrode 2212 formed on a surface of the first base substrate 2211, and the second electrode plate 2220 comprises a second base substrate 2221 and a second surface electrode 2222 formed on a surface of the second base substrate 2221. When the first electrode plate 2210 and the second electrode plate 2220 are opposed to each other, the first surface electrode 2212 and the second surface electrode 2222 are opposed to each other, and the polymer dispersed liquid crystal layer 2200 is located between the first surface electrode 2212 and the second surface electrode 2222.

In some embodiments, as shown in FIG. 5, the video calling system according to the embodiment of the present disclosure further comprises a housing 400 having an opening. The apparatus 100 for controlling a video call, the projection unit 210, and the video collector 300 are disposed in the housing 400, and the scattering screen 220 is disposed at the opening. Since the scattering screen 220 has a function of scattering light in the scattering state, if an inner surface of the housing 400 and outer surfaces of the apparatus 100 for controlling a video call, the projection unit 210, and the video collector 300 in the housing 400 have better reflection effects, it is easy to interfere with the video of the local party which is presented when the local user is viewing the scattering screen 220. Therefore, the inner surface of the housing 400, the outer surface of the projection unit 210, and the video collector 300 should be provided with matte films, or should be subjected to matting processing, so that the local user may not easily see a structure inside the housing 400 through the scattering screen 220 in a process of viewing a video.

In some embodiments, the projection unit 210 is a related projection device such as an ultra-short throw projection system etc., and may also be a projection unit 210 having the following structure. As shown in FIG. 5, the projection unit 210 comprises a two-dimensional optical modulator 211, an illumination module 212, and a projection lens 213.

The two-dimensional optical modulator 211 is connected to the display data control module 132, and is configured to convert the video information of the remote party into the video of the remote party, wherein a refresh rate of the two-dimensional optical modulator 211 is equal to a projection refresh rate of the projection unit 210. The two-dimensional optical modulator 211 may be a micro-display device such as a micro-liquid crystal display, a silicon-based liquid crystal display, a digital micro-mirror rear projection display etc.

The illumination module 212 is configured to perform light enhancement on the video of the remote party. For example, when the display is a liquid crystal display panel, the illumination module 212 is generally composed of a high-brightness light-emitting diode, a beam collecting lens, and a light homogenizing lens. The high-brightness light-emitting diode provides light with high brightness. The beam collecting lens collects the light with high intensity, and forms a surface light source through the light homogenizing lens and provides the surface light source to the display, so that the display displays the video of the remote party.

The projection lens 213 is configured to project the video of the remote party onto the projection surface of the scattering screen 220. The projection lens 213 is an ultra-short throw projection lens 213, and of course, may also be another projection lens 213. For example, the projection lens 213 comprises a group of spherical/aspheric lenses and a free-form curved reflector which may project an image of the micro-display device onto the projection surface of the scattering screen 220 within a very short distance.

In some embodiments, as shown in FIG. 5, the video collector 300 is a movable video collector, and specifically comprises a camera 320 and a direction adjustment mechanism 310.

The camera 320 is configured to collect image information in a collection phase. There are many types of cameras 320, as long as they have a video collection function.

The direction adjustment mechanism 310 is configured to adjust a position of the camera 320 relative to the display apparatus 200, and adjust an angle formed by an optical axis of a lens of the camera 320 and a display surface of the display apparatus 200 to adjust a collection angle of the video collector 300.

As shown in FIGS. 2 and 3, when the collection control unit 120 comprises a video analysis module 122, an alignment control module 123, and an information collection module 121, the alignment control module 123 is connected to the direction adjustment mechanism 310 to control the direction adjustment mechanism 310 using the alignment control module 123, so as to achieve the purpose of adjusting a position and/or an angle of the camera 320. The information collection module 121 is connected to the camera 320, so that the information collection module 121 may receive the image information of the local party collected by the camera 320, and at the same time, the information collection module 121 may also be used to control a collection time of the camera 320, so that a time interval between two adjacent collection processes of the camera 320 is less than or equal to one display time period.

In some embodiments, as shown in FIGS. 3 and 5, the direction adjustment mechanism 310 is a four-axis motion platform for controlling movement of the camera 320 in an X direction and a Y direction and controlling rotation of the camera 320 along a line in the X direction and along a line in the Y direction. A plane formed by the line in the X direction and the line in the Y direction is parallel to the projection surface of the scattering screen 220. The line in the X direction is perpendicular to the line in the Y direction.

For example, when the position of the video collector 300 relative to the display apparatus 200 is controlled, the movement of the camera 320 in the X direction and the Y direction is controlled by using the four-axis motion platform according to the information of the midpoint of the eyes of the remote party represented by the position information of the midpoint of the eyes of the remote party, until the camera 320 moves to the position of the midpoint of the eyes of the remote party presented by the video of the remote party displayed by the scattering screen 220 which is in the scattering state. When the collection angle of the video collector 300 is controlled, it only needs to control the rotation of the camera 320 along the line in the X direction and the line in the Y direction using the four-axis rotation platform according to the position information of the face of the local party, until the lens of the video collector 300 is aligned with the face of the local party.

Only a working process of the video calling system according to the embodiment of the present disclosure in a first video call period Ts1 will be described below with reference to FIGS. 2-3 and 5-7, and working processes of the video calling system in other video call periods may be performed in the same manner as the working process of the video calling system in the first video call period Ts1.

The first video call period Ts1 comprises a first display time period tp1 and a first collection time period tc1.

In the first display time period tp1, the display state control module 131 does not provide voltages to the first electrode plate 2210 and the second electrode plate 2220, so that the polymer dispersed liquid crystal layer 2200 is in a chaotic state, a high-brightness light-emitting diode as the illumination module 212 provides light with high brightness to a micro-liquid crystal display as the two-dimensional optical modulator 211, and the display data control module 132 controls the micro-liquid crystal display to modulate the light with high brightness to obtain light with high brightness of the video of the remote party. At least one frame of the video of the remote party is projected onto the projection surface of the scattering screen 220 which is in the chaotic state using the light with high intensity of the video of the remote party through the projection lens 213, and at this time, the local user may view the video of the remote party on the side of the scattering screen 220 where the display surface is located. At the same time, in the first display time period tp1, the video analysis module 122 further analyzes the video information of the remote party to obtain the position information of the midpoint of the eyes of the remote party, which is coordinate data of the position of the midpoint of the eyes of the remote party, and the alignment control module 123 controls the four-axis motion platform according to the coordinate data of the position of the midpoint of the eyes of the remote party, so that the four-axis motion platform controls a coordinate position of the camera 320 according to the coordinate data of the position of the midpoint of the eyes of the remote party. Thereby, the camera 320 moves relative to the projection surface of the scattering screen 220 to achieve the purpose of tracking the position of the midpoint of the eyes of the remote party. In addition, in the first display time period tp1, the camera 320 may be maintained in a turn-on state or may be maintained in a turn-off state. Specific image processing may be known with reference to the above description.

In the first collection time period tc1, the display state control module 131 provides voltages to the first electrode plate 2210 and the second electrode plate 2220, so that the polymer dispersed liquid crystal layer 2200 is in a transparent state, and the high-brightness light-emitting diode stops providing the light with high brightness to the micro-liquid crystal display, so that the projection lens 213 does not project the video of the remote party onto the projection surface of the scattering screen which is in the transparent state. At this time, the information collection module 121 collects at least one frame of the image information of the local party through the scattering screen 220 which is in the transparent state, and at the same time, the video analysis module 122 analyzes the image information of the local party to obtain the position information of the face of the local party, and the alignment control module 123 controls the four-axis motion platform according to the position information of the face of the local party, so that the four-axis motion platform controls the camera 320 to rotate along the X-axis or the Y-axis to adjust an angle of the lens of the camera 320. In this way, the adjustment of the collection angle of the camera 320 is completed, so that the lens of the camera 320 is aligned with the geometric center of the face of the local party.

A second video call period Ts2 comprises a second display time period tp2 and a second collection time period tc2. After the end of the first video call period Ts1, in the second video call period Ts2, the processes in the first display time period tp1 and the first collection time period tc1 of the first video call period Ts1 are repeated. Since the lens of the camera 320 has been aligned with the geometric center of the face of the local party in the first collection time period tc1, and the time of the display time period and the time of the collection time period in each video call period are in units of milliseconds, after the end of each video call period, there is almost no change in the position of the face of the local user after the start of a new video call period, thereby ensuring the accuracy of the information of the face of the local party expressed by the image information of the local party collected by the camera 320 during a subsequent video call.

It may be understood that during the video call, the process of controlling the camera 320 by the four-axis motion platform is a dynamic adjustment process, which is always adapted to the position information of the face of the local party and the position information of the midpoint of the eyes of the remote party which are analyzed by the video analysis module 122.

Figure 8:
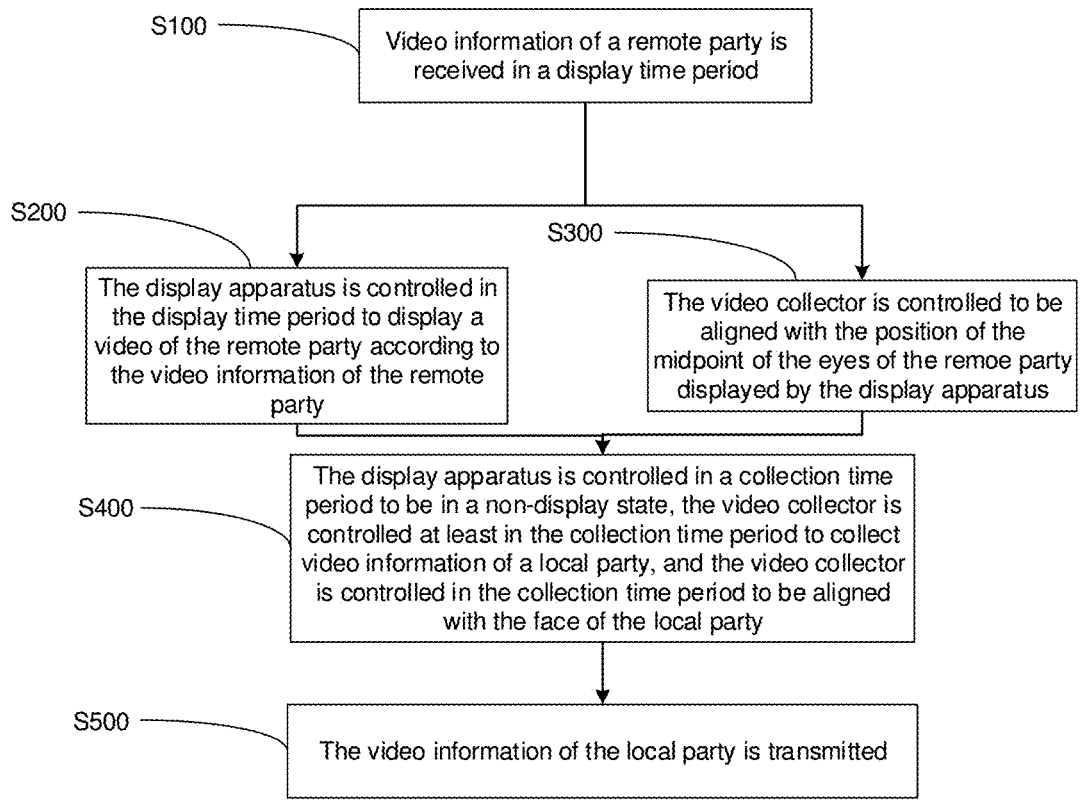
FIG. 8 is a flowchart of a method for controlling a video call according to an embodiment of the present disclosure.

As shown in FIGS. 3, 5 and 8, the embodiments of the present disclosure further provide a method for controlling a video call, wherein the method for controlling a video call is applied in a plurality of call periods, and each of the call periods comprises a display time period and a collection time period. In each call period, the method for controlling a video call comprises the following steps.

In step S100, video information of a remote party is received in a display time period.

In step S200, the display apparatus 200 is controlled in the display time period to display a video of the remote party according to the video information of the remote party.

In step S400, the display apparatus 200 is controlled in a collection time period to be in a non-display state, the video collector 300 is controlled at least in the collection time period to collect video information of a local party, and the video collector 300 is controlled in the collection time period to be aligned with a face of the local party.

In step S500, the video information of the local party is transmitted.

Compared with the related art, the beneficial effects of the method for controlling a video call according to the embodiment of the present disclosure are the same as those of the apparatus 100 for controlling a video call described above, and will not be described in detail herein.

Figure 9:
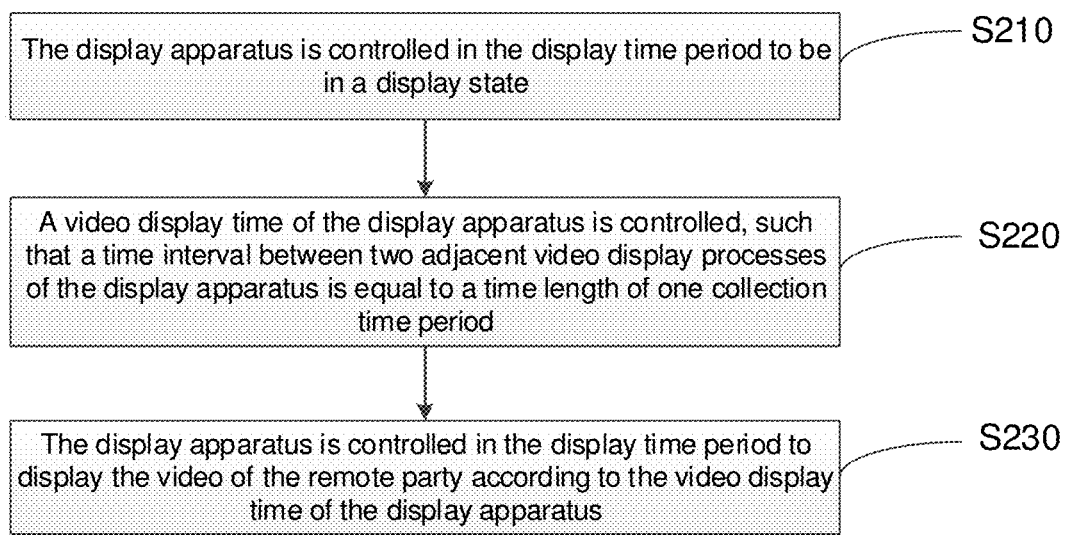
FIG. 9 is a flowchart of control in a display time period according to an embodiment of the present disclosure.

Here, as shown in FIGS. 3, 5 and 9, controlling, in the display time period, the display apparatus 200 to display a video of the remote party according to the video information of the remote party comprises the following steps.

In step S210, the display apparatus 200 is controlled in the display time period to be in a display state.

In step S220, a video display time of the display apparatus 200 is controlled, so that a time interval between two adjacent video display processes of the display apparatus 200 is equal to a time taken for one collection time period.

In step S230, the display apparatus 200 is controlled in the display time period to display the video of the remote party according to the video display time of the display apparatus 200.

Figure 11:
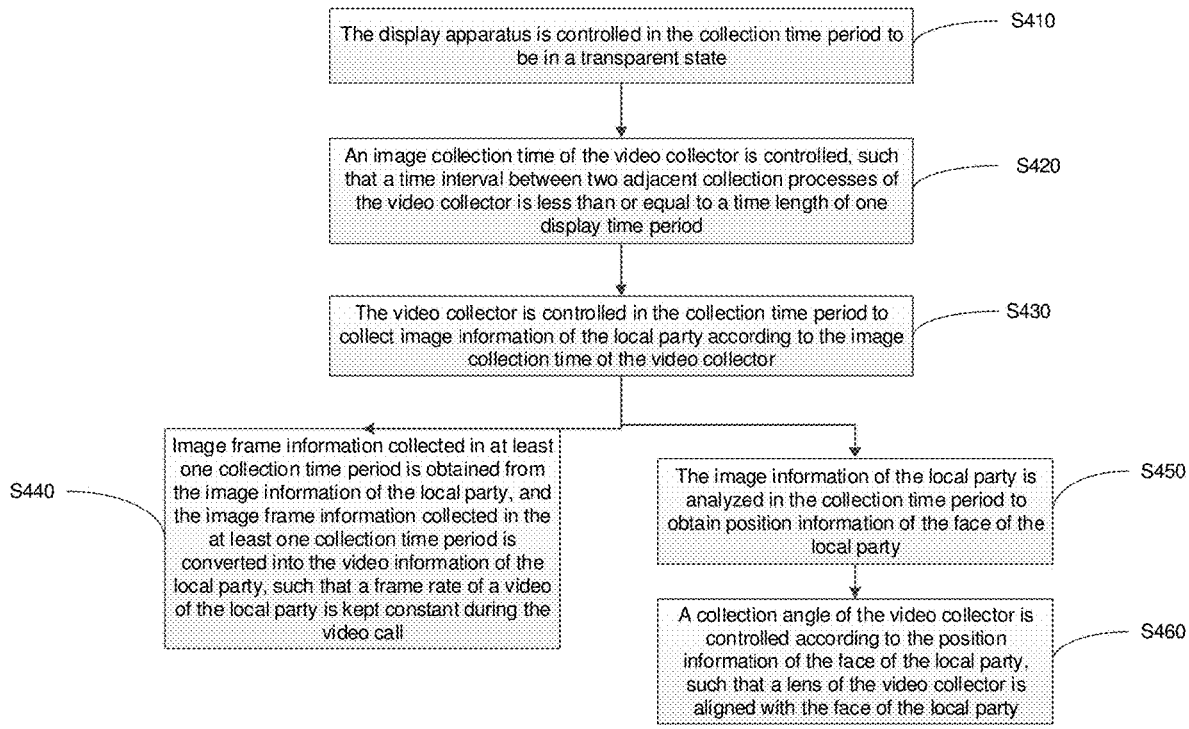
FIG. 11 is a flowchart of control in a collection time period according to an embodiment of the present disclosure.

In some embodiments, as shown in FIGS. 2 and 11, controlling, in a collection time period, the display apparatus 200 to be in a non-display state comprises the following steps.

In step S410, the display apparatus 200 is controlled in the collection time period to be in a transparent state. At this time, the display apparatus 200 may not display the video of the remote party. When the display apparatus 200 comprises the projection unit 210 and the scattering screen 220, the scattering screen 220 may be controlled to be in the transparent state, so that the display apparatus 200 is in the non-display state.

Controlling, at least in the collection time period, the video collector 300 to collect video information of a local party comprises the following steps.

In step S420, an image collection time of the video collector 300 is controlled, so that a time interval between two adjacent collection processes of the video collector 300 is less than or equal to a time taken for one display time period.

In step S430, the video collector 300 is controlled in the collection time period to collect image information of the local party according to the image collection time of the video collector 300.

In step S440, image frame information collected in at least one collection time period is obtained from the image information of the local party, and the image frame information collected in the at least one collection time period is converted into the video information of the local party, so that a frame rate of a video of the local party is kept constant during the video call.

As shown in FIGS. 5, 8 and 11, controlling, in the collection time period, the video collector 300 to be aligned with a face of the local party comprises the following steps.

In step S450, the image information of the local party is analyzed in the collection time period to obtain position information of the face of the local party.

In step S460, a collection angle of the video collector 300 is controlled according to the position information of the face of the local party, so that a lens of the video collector 300 is aligned with the face of the local party.

It may be understood that the above steps S440 and S450 may be performed at the same time, or may be performed sequentially.

Figure 10:
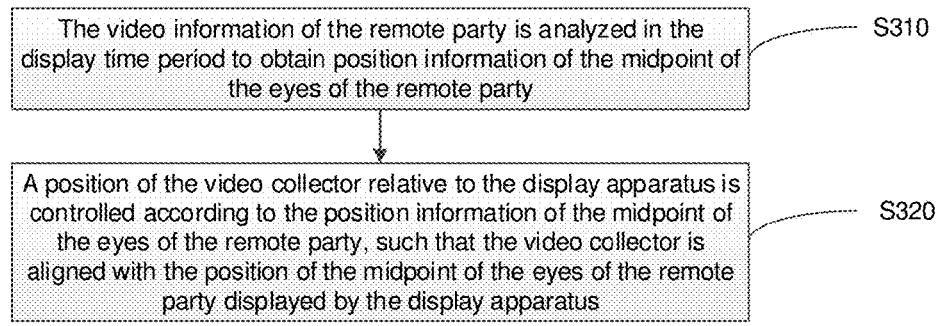
FIG. 10 is a flowchart of control in a display time period according to another embodiment of the present disclosure.

In some embodiments, as shown in FIGS. 5, 8, and 10, when the display apparatus 200 is controlled in the display time period to display the video of the remote party according to a video refresh rate of the display apparatus 200, the method further comprises the following step.

In step S300, the video collector 300 is controlled to be aligned with a position of a midpoint of eyes of the remote party displayed by the display apparatus 200. Step S300 is specifically implemented using the following steps.

In step S310, the video information of the remote party is analyzed in the display time period to obtain position information of the midpoint of the eyes of the remote party.

In step S320, a position of the video collector 300 relative to the display apparatus 200 is controlled according to the position information of the midpoint of the eyes of the remote party, so that the video collector 300 is aligned with the position of the midpoint of the eyes of the remote party displayed by the display apparatus 200.

The embodiments of the present disclosure further provide a non-transitory computer storage medium for storing computer instructions used by the apparatus 100 for controlling a video call, comprising a program designed to execute the above method embodiments. The computer storage medium comprises, but not limited to, a disk storage, a CD-ROM, an optical storage, etc.

Figure 4:
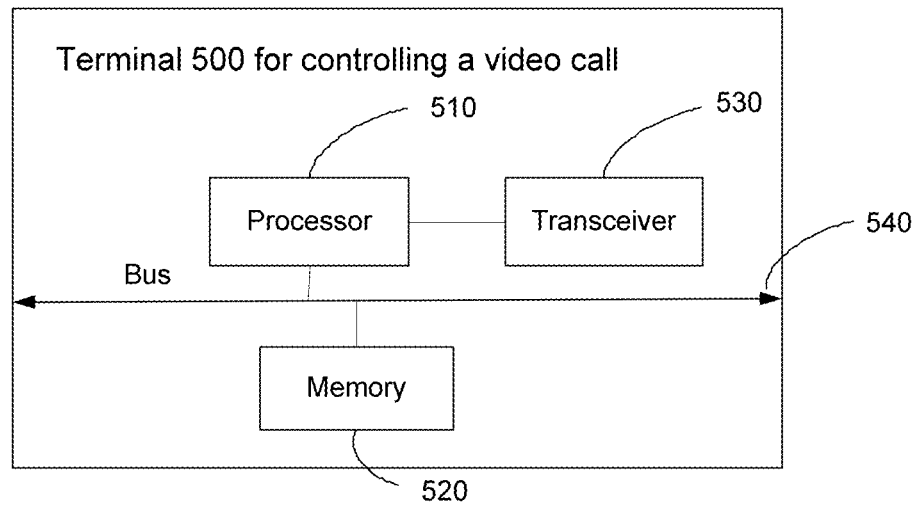
FIG. 4 is a structural diagram of a terminal for controlling a video call according to an embodiment of the present disclosure.

As shown in FIG. 4, the embodiments of the present disclosure further provide a terminal 500 for controlling a video call (for example, the apparatus 100 for controlling a video call). The terminal 500 for controlling a video call comprises a processor 510, a memory 520, a transceiver 530, and a bus 540. The processor 510, the memory 520, and the transceiver 530 communicate with each other through the bus 540.

Here, the memory 520 is configured to store a plurality of instructions, and the processor 510 executes the plurality of instructions to implement the method for controlling a video call according to the embodiments of the present disclosure.

The processor 510 described in the embodiment of the present disclosure may be one processor or a set of a plurality of processing elements. For example, the processor 510 may be a CPU, an ASIC, or one or more integrated circuits configured to implement the embodiments of the present disclosure, for example, one or more DSPs, or one or more FPGAs.

The memory 520 may be a storage apparatus or a set of a plurality of storage elements, and is used to store executable program codes etc. Further, the memory 520 may comprise a Random Access Memory (RAM), or may also comprise a non-volatile memory such as a magnetic disk memory, a flash memory, etc.

The bus 540 may be an Industry Standard Architecture (ISA) bus, a Peripheral Component (PCI) bus, or an Extended Industry Standard Architecture (EISA) bus etc. The bus may be divided into an address bus, a data bus, a control bus, etc. For convenience of representation, the bus is represented by only one thick line shown in FIG. 4, but it does not mean that there is only one bus or one type of buses.

In the description of the above embodiments, specific features, structures, materials or characteristics may be combined in any suitable manner in any one or more embodiments or examples.

The above description is only the specific embodiments of the present disclosure, but the protection scope of the present disclosure is not limited thereto. Changes or substitutions which may be easily reached by any person skilled in the art within the technical scope of the present disclosure should be covered within the protection scope of the present disclosure. Therefore, the protection scope of the present disclosure should be determined by the protection scope of the claims.

We claim:

1. An apparatus for controlling a video call, the apparatus comprising:
   a transceiver configured to receive, in a display time period, video information of a remote party and transmit video information of a local party;
   a processor communicatively connected to the transceiver; and
   a memory having stored thereon instructions which, when executed by the processor, cause the processor to:
   control, at least in a collection time period, a video collector to collect the video information of the local party, and control, in the collection time period, the video collector to be aligned with the face of the local party; and
   control, in the collection time period, a display apparatus to be in a non-display state, and control, in the display time period, the display apparatus to display a video of the remote party according to the video information of the remote party, wherein the display apparatus comprises:
      a scattering screen configured to be in a scattering state in the display time period, and be in a transparent state in the collection time period, wherein a display surface of the scattering screen faces opposite to a projection surface of the scattering screen, and the video collector is located on one side of the scattering screen where the projection surface is located; and
      a projection unit configured to convert, in the display time period, the video information of the remote party into the video of the remote party, and project a displayed picture onto the projection surface of the scattering screen.

2. The apparatus according to claim 1, wherein the instructions, when executed by the processor, further cause the processor to:
   control a video call timing, such that the video call is switched between the display time period and the collection time period alternatively.

3. The apparatus according to claim 2, wherein the instructions, when executed by the processor, further cause the processor to: control, in the display time period, the display apparatus to be in a display state; and control, in the collection time period, the display apparatus to be in a transparent state.

4. The apparatus according to claim 2, wherein the instructions, when executed by the processor, further cause the processor to:
   control a video display time of the display apparatus, such that a time interval between two adjacent video display processes of the display apparatus is equal to a time length of one collection time period, and control the display apparatus to display the video of the remote party according to the video display time of the display apparatus.

5. The apparatus according to claim 2, wherein the instructions, when executed by the processor, further cause the processor to:
   analyze the video information of the remote party in the display time period to obtain position information of the midpoint between the eyes of the remote party, and analyze image information of the local party in the collection time period to obtain position information of the face of the local party;
   control the position of the video collector relative to the display apparatus according to the position information of the midpoint between the eyes of the remote party, such that the video collector is aligned with a position of the midpoint between the eyes of the remote party displayed by the display apparatus; and
   control a collection angle of the video collector according to the position information of the face of the local party, such that a lens of the video collector is aligned with the face of the local party.

6. The apparatus according to claim 2, wherein the instructions, when executed by the processor, further cause the processor to:
   control an image collection time of the video collector, such that a time interval between two adjacent collection processes of the video collector is less than or equal to a time length of one display time period, control the video collector to collect image information of the local party according to the image collection time of the video collector, obtain image frame information collected in at least one collection time period from the image information of the local party, and convert the image frame information collected in the at least one collection time period into the video information of the local party, such that a frame rate of a video of the local party is kept constant during the video call.

7. A video calling system, comprising:
   the apparatus for controlling a video call according to claim 1,
   the display apparatus, and
   the video collector,
   wherein the video collector and the display apparatus are communicatively connected to the apparatus for controlling a video call.

8. The video calling system according to claim 7, wherein a time interval between two adjacent projection processes of the projection unit is equal to a time length of one collection time period, and a time interval between two adjacent image collection processes of the video collector is less than or equal to a time length of one display time period.

9. The video calling system according to claim 7, wherein the projection unit comprises:
   a two-dimensional optical modulator communicatively connected to the apparatus for controlling a video call, and configured to convert the video information of the remote party into the video of the remote party, wherein a refresh rate of the two-dimensional optical modulator is equal to a projection refresh rate of the projection unit;
   an illumination module configured to perform light enhancement on the video of the remote party; and
   a projection lens configured to project the video of the remote party onto the projection surface of the scattering screen.

10. The video calling system according to claim 7, wherein the scattering screen comprises:
    a first electrode plate;
    a second electrode plate; and
    a polymer dispersed liquid crystal layer between the first electrode plate and the second electrode plate, wherein the apparatus for controlling a video call is connected to the first electrode plate and the second electrode plate, respectively.

11. The video calling system according to claim 7, wherein the video collector comprises:
  a camera configured to collect image information in the collection time period; and
  a direction adjustment mechanism configured to adjust a position of the camera relative to the display apparatus, and/or adjust a collection angle of the video collector, wherein the apparatus for controlling a video call is communicatively connected to the direction adjustment mechanism and the camera.

12. A method for controlling a video call comprising a plurality of call periods, each of the call periods comprising a display time period and a collection time period, the method comprising, in each of the call periods:
  receiving video information of a remote party;
  controlling, in the display time period, a display apparatus to display a video of the remote party according to the video information of the remote party, wherein the display apparatus comprises:
    a scattering screen configured to be in a scattering state in the display time period, and be in a transparent state in the collection time period, wherein a display surface of the scattering screen faces opposite to a projection surface of the scattering screen, and the video collector is located on one side of the scattering screen where the projection surface is located; and
    a projection unit configured to convert, in the display time period, the video information of the remote party into the video of the remote party, and project a displayed picture onto the projection surface of the scattering screen;
  controlling, in the collection time period, the display apparatus to be in a non-display state; controlling, at least in the collection time period, a video collector to collect video information of a local party; and controlling, in the collection time period, the video collector to be aligned with the face of the local party; and
  transmitting the video information of the local party.

13. The method according to claim 12, wherein controlling, in the display time period, the display apparatus to display a video of the remote party according to the video information of the remote party comprises:
  controlling, in the display time period, the display apparatus to be in a display state;
  controlling a video display time of the display apparatus, such that a time interval between two adjacent video display processes of the display apparatus is equal to a time length of one collection time period; and
  controlling, in the display time period, the display apparatus to display the video of the remote party according to the video display time of the display apparatus.

14. The method according to claim 12, wherein controlling, in the collection time period, the display apparatus to be in a non-display state comprises:
  controlling, in the collection time period, the display apparatus to be in a transparent state.

15. The method according to claim 12, wherein controlling, at least in the collection time period, the video collector to collect video information of a local party comprises:
  controlling an image collection time of the video collector, such that a time interval between two adjacent collection processes of the video collector is less than or equal to a time length of one display time period;
  controlling, in the collection time period, the video collector to collect image information of the local party according to the image collection time of the video collector; and
  obtaining image frame information collected in at least one collection time period from the image information of the local party, and converting the image frame information collected in the at least one collection time period into the video information of the local party, such that a frame rate of a video of the local party is kept constant during the video call.

16. The method according to claim 12, wherein controlling, in the collection time period, the video collector to be aligned with a face of the local party comprises:
  analyzing, in the collection time period, the image information of the local party to obtain position information of the face of the local party; and
  controlling a collection angle of the video collector according to the position information of the face of the local party, such that a lens of the video collector is aligned with the face of the local party.

17. The method according to claim 12, wherein:
  when the display apparatus is controlled in the display time period to display the video of the remote party according to a video refresh rate of the display apparatus, the method further comprises:
  analyzing the video information of the remote party in the display time period to obtain position information of the midpoint between the eyes of the remote party; and
  controlling a position of the video collector relative to the display apparatus according to the position information of the midpoint between the eyes of the remote party, such that the video collector is aligned with a position of the midpoint between the eyes of the remote party displayed by the display apparatus.

18. A non-transitory computer storage medium having stored thereon computer instructions which, when executed by a processor, cause the processor to perform the method according to claim 12.

* * * * *